(12) United States Patent
Baudonnel

(10) Patent No.: US 7,326,662 B2
(45) Date of Patent: Feb. 5, 2008

(54) FIBROUS STIFFENER WITH BARRIER FUNCTION FOR MAKING COMPOSITE PARTS, AND COMPOSITE PARTS USING THIS STIFFENER

(75) Inventor: Jacques Baudonnel, Place Couverte (FR)

(73) Assignee: Chomarat Composites, Paris (FR)

( * ) Notice: Subject to any disclaimer, the term of this patent is extended or adjusted under 35 U.S.C. 154(b) by 282 days.

(21) Appl. No.: 10/440,175

(22) Filed: May 19, 2003

(65) Prior Publication Data

US 2003/0219579 A1 Nov. 27, 2003

(30) Foreign Application Priority Data

May 21, 2002 (FR) .................................. 02 06154

(51) Int. Cl.
*B32B 27/12* (2006.01)
*B32B 25/10* (2006.01)

(52) U.S. Cl. ............... 442/394; 442/352; 442/381; 442/388; 442/389; 442/399; 428/102; 428/223

(58) Field of Classification Search ............... 442/394, 442/399, 381, 388, 389, 352; 428/102, 223
See application file for complete search history.

(56) References Cited

U.S. PATENT DOCUMENTS

| | | | |
|---|---|---|---|
| 3,622,035 A | * | 11/1971 | Suter ........................ 280/834 |
| 3,998,986 A | * | 12/1976 | Williams .................... 428/102 |
| 4,526,828 A | * | 7/1985 | Fogt et al. .................... 442/19 |
| 5,391,425 A | * | 2/1995 | Isley, Jr. et al. ............ 428/102 |
| 5,569,344 A | | 10/1996 | Grimnes |
| 5,667,882 A | | 9/1997 | Fourezon et al. |
| 2002/0009936 A1 | * | 1/2002 | North et al. ................. 442/149 |

FOREIGN PATENT DOCUMENTS

| | | |
|---|---|---|
| EP | 786330 | 7/1997 |
| EP | 1086801 | 3/2001 |
| FR | 2646442 | 11/1990 |
| JP | 2000/108223 | 4/2000 |

* cited by examiner

*Primary Examiner*—Norca L. Torres Velazquez
(74) *Attorney, Agent, or Firm*—Dennison, Schultz & MacDonald

(57) ABSTRACT

Fibrous stiffener (1) for making composite parts molded from an injected resin base, of the type comprising at least one layer (2) based on stiffening fibers, characterized in that the layer (2) is connected by sewing or stitching to an elastomer sheet (6) extending over one of the wide faces of the layer (2) and performing a barrier function for any resin injected on one side or the other side of this sheet (6), the said elastomer sheet (6) being associated with a non-woven material (7) on at least one of its faces, to improve the adhesion of a resin injected on this side of the sheet (6).

9 Claims, 1 Drawing Sheet

FIBROUS STIFFENER WITH BARRIER FUNCTION FOR MAKING COMPOSITE PARTS, AND COMPOSITE PARTS USING THIS STIFFENER

BACKGROUND OF THE INVENTION

This invention relates to the technical domain of production of materials or composite parts that may or may not be conformed and that can be used directly or after transformation or association, particularly to form shaped structures or articles required in very many applications. More precisely, the purpose of the invention is a fibrous stiffener for making composite parts, that acts as a barrier for injected resins, and composite parts comprising such a stiffener.

Composite parts according to prior art usually combine at least one additional reinforcement, usually made of a textile or similar material, with a resin matrix usually of the thermosetting type, in which the said reinforcement is embedded so that it is present either within the thickness of the formed part or at the surface, in order to combine light weight with an acceptable mechanical strength.

It can be considered that these techniques are well controlled and are satisfactory in most applications. In other cases, it is desirable to have thick stiffeners required in some applications, for example plane or formed parts such as bodywork elements, pleasure boats, tanks or even aircraft. It has also been proposed that textile reinforcements like that described in patent FR 2 646 442 or in patent FR 2 734 847 could be used.

It is increasingly important to have simple and low cost techniques for making preforms for thick and lightweight walls or for large and lightweight bodies. When this type of preform is being designed, a thermosetting resin is injected in the liquid state adjacent to the stiffener arranged with the required form. Therefore it is essential to have a stiffener which, due to its nature, prevents the migration of resin through the stiffener before the resin polymerizes.

Furthermore, it is frequently desirable to inject different natures of resin on each side of the stiffener. For example, it is necessary to inject a resin such as a foaming resin in the central position of the composite part, to give the composite part the required volume while remaining light weight, and another resin performing a mechanizing function around the periphery in order to consolidate its external walls.

In general, it is necessary to make a first core in a first mould, for example by injecting polyurethane resin. This polyurethane core must then be sanded to make it adhesive, knowing that after the polyurethane surface has been molded its surface condition is smooth, after wax has been deposited. Finally, this polyurethane core is placed in a second mould with the textile stiffener to inject the second resin.

Therefore, it is usually necessary to make a preform composed of the polyurethane core associated with the fibrous stiffener used for the second injection. Therefore, composite parts are made in two molding steps with two slightly modified moulds, one for the first injection and the other for the second injection.

SUMMARY OF THE INVENTION

In this context, one of the purposes of the invention is to provide a sufficiently leak tight stiffening product to perform a barrier function between the two media on each side of this barrier, to maintain their integrity. The leak tightness objective may be related to confinement in the two media or once again to the need to control migration of a coating or decoration product that can be applied to one of the faces of the final composite part or the stiffener. In particular, this type of stiffener can be used to make molded parts in a single step.

The purpose of this invention is to satisfy this requirement by suggesting improvements to textile stiffeners, such that these stiffeners can perform a second barrier function for the injected resin(s) and possibly for a coating or decoration product that can be applied to the composite part or directly onto one of the wide stiffener faces.

The stiffener according to the invention must also have appropriate surface properties to enable bonding of subsequently injected resins.

In order to achieve these objectives according to the invention, the fibrous stiffener for making composite parts molded from an injected resin base comprises at least one layer based on stiffening fibers. The said layer is connected by sewing or stitching to an elastomer sheet extending over one of the wide faces of the layer and performing a barrier function for any resin injected on one side or the other side of this sheet, the said elastomer sheet being associated with a non-woven material on at least one of its faces to improve the adhesion of a resin injected on this side of the sheet.

Another purpose of the invention is a composite part obtained from a fibrous stiffener according to the invention and at least two thermosetting or thermoplastic resin matrices each confined on each side of the fibrous stiffener.

BRIEF DESCRIPTION OF THE DRAWINGS

Various other characteristics can be determined from the following description with reference to the attached drawings that show embodiments and means of implementation of the subject of the invention, as non-limitative examples.

DESCRIPTION OF THE PREFERRED EMBODIMENTS

The invention relates to a fibrous stiffener specifically with a leak tightness function for making composite parts that may or may not be molded, based on an injected thermosetting resin, such that this fibrous stiffener forms a textile type additional reinforcement, at least partly embedded in a resin matrix and particularly a thermosetting or thermoplastic resin.

Figure 1:
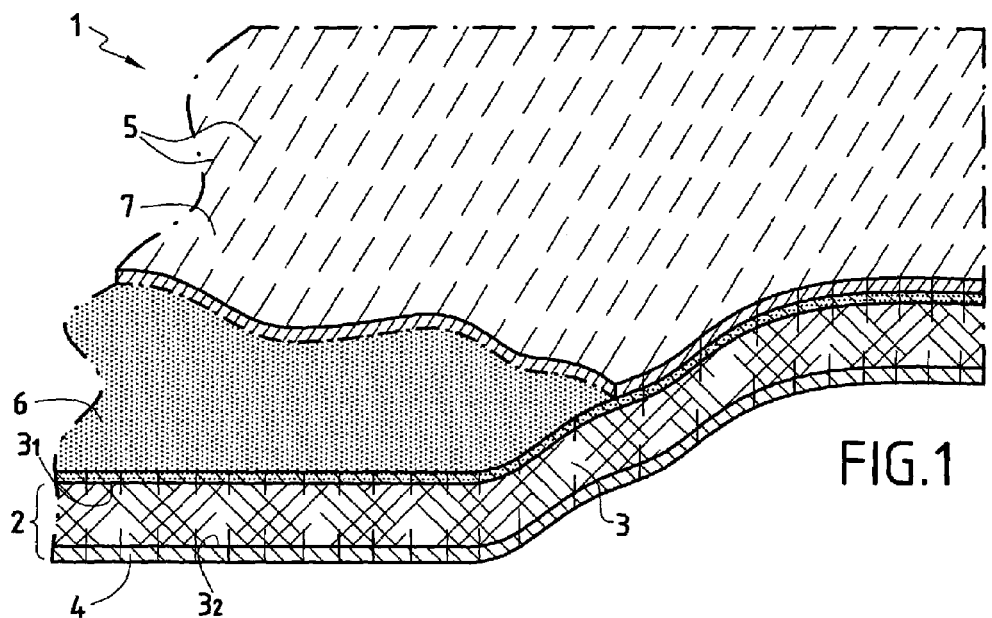
FIG. 1 is a partly exposed perspective view illustrating a first embodiment of the fibrous stiffener according to the invention.
Figure 2:
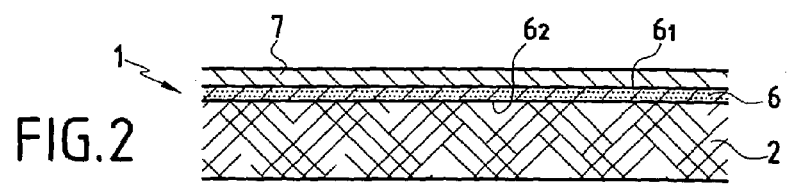
FIG. 2 is a partial transverse section-elevation at a larger scale of the fibrous stiffener according to FIG. 1.

One embodiment of the fibrous stiffener according to the invention denoted as a whole by reference 1 is illustrated in FIGS. 1 and 2.

This type of stiffener comprises a layer 2 based on stiffening fibers, essentially with an additional reinforcement characterized by a significant thickness. Note that the invention is equally applicable to thin additional reinforcement, and consequently the embodiment shown in FIG. 1 is only given as an example.

In this example, the layer 2 is composed essentially of a core 3 based on appropriate fibers. Preferably but not limitative, these fibers were crimped to reduce the weight and thickness characteristics to the core 3, and to create an aerated texture. In one example, the core 3 may be composed of polyester or polypropylene fibers with a titer equal to at least 30 decitex (dtex), a cut length of between 40 and 110 mm that have previously being formed under the layer to apply a texturing treatment to give them a permanent crimping effect.

As shown in FIGS. 1 and 2, the core 3 is advantageously used with a textile stiffener layer such as layer 4, on one of its faces for example $3_2$. The stiffener layer 4 may advantageously be composed of fibrous layers such as glass and/or carbon and/or aramide fiber layers, smooth or two directional layers, or adjacent or contiguous or spaced threads made of glass, carbon or aramide. Note that the layer 2 may also be composed of several cores 3 or materials with a resin creep or drainage function, and layers 4, and that in most cases the deformability and flexibility capability of this layer 2 makes it capable of matching various conformations.

The fibrous stiffener according to the invention also comprises an elastomer sheet 6 on one of the faces of the layer 2 that will perform a barrier function such that a thermosetting resin matrix injected with the stiffener on one of the two sides remains confined on this side, its migration being prevented by the flexible elastomer sheet 6. As shown on FIGS. 1 and 2, the core 3 is associated with the textile stiffener layer 4 on one of its faces $3_2$, and with the elastomer sheet 6 on its other face $3_1$.

This elastomer sheet 6 is made from a flexible, deformable and elastic material. For example, a natural rubber or a synthetic or artificial rubber sheet such as styrene butadiene rubber (SBR), chloroprene rubber, nitrile butadiene rubber (NBR) or isoprene rubber (IR) may be used. The sheet 6 advantageously and independently has a thickness of between 0.15 to 0.5 mm, a density of 0.9 to 1.25, a stress modulus of 0.15 to 2 MPa, preferably greater than or equal to 0.5 MPa for 100% deformation and elongation at failure equal to 50 to 600%, and preferably greater than or equal to 400%. A 0.3 to 0.4 mm thick natural rubber sheet with a density of 1.1 and with a stress modulus of 1.1 MPa for 100% deformation and an elongation at failure of greater than 600% are particularly suitable for this invention.

Furthermore, this sheet 6 is treated on at least one of its faces and preferably on its face $6_1$ on the opposite side of layer 2, to improve adhesion of any subsequently injected resin when the molded part is designed. This treatment consists of associating the face $6_1$ of the elastomer sheet with a non-woven material 7.

Figure 3:
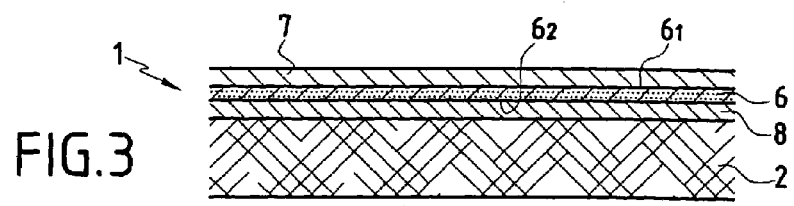
FIG. 3 is a partial transverse section-elevation conform with FIG. 2 illustrating another variant embodiment of the subject of the invention.

Advantageously, as shown in FIG. 3, the face $6_2$ on the same side of the layer 2 as the elastomer sheet 6, may also be treated to improve adhesion of a resin injected on this side of the elastomer sheet 6. On this side, bond of the resin is already facilitated by the presence of the layer 2. In this case, the elastomer sheet 6 is advantageously associated with a non-woven material 7 on its face $6_1$ and with another non-woven material 8 on its face $6_2$. For example, the non-woven materials 7 and 8 are arranged on the faces of the elastomer sheet 6 when the elastomer sheet is made. In particular, the bond may be made by thermo compression.

Non-woven materials 7 and 8 preferably have a porosity chosen as a function of the nature and the viscosity of the resins in the injection state that will be used during manufacture of subsequent molded part. Non-woven materials 7 and 8 are preferably but not exclusively based on fibers of the same nature and particularly mechanically bonded short fibers. According to one particular embodiment, the non-woven material 7 and if applicable the non-woven material 8 are based on polyethylene terephthalate or acrylic fibers with a titer of between 0.5 and 6.7 decitex and a surface density of 20 to 100 g/m².

Therefore, it can be seen that the fibrous stiffener 1 according to the invention is composed of several layers. The cohesion of the stiffener 1 is made by sewing-stitching. This sewing-stitching is a means of connecting the layer 2 with the elastomer sheet 6 associated with one or two non-woven materials 7 and 8. In general, sewing-stitching 5 is used to connect the stiffener layer 4 to the core 3 to form the layer 2 and to bond this layer 2 to the elastomer sheet 6. For example, this sewing-stitching may be made using a synthetic thread.

Therefore, it can be seen that the presence of the elastomer sheet 6 is an essential characteristic of the invention. Even after sewing-stitching, this sheet 6 must perform its leak tightness barrier function. The elastomer sheet 6, due to its flexibility and elasticity, tightens around the sewing-stitching thread after the needle has passed through it to make the seal. The function of the sheet 6 is to oppose the migration of the thermoplastic or thermosetting resin that is injected in the liquid or paste state, when the molded parts are being designed. Thus, before polymerization is complete and/or before the resin has been set, the resin remains confined on each side of the elastomer sheet 6.

Therefore the fibrous stiffener according to the invention is both flexible, deformable and leak tight. Thus, it is perfectly suitable for making preforms or molded composite parts. Its purpose is to form an additional reinforcement for such a composite part that is obtained principally by the injection of one or several resins, and particularly thermoplastic or thermosetting resins, and not necessarily by molding and conformation.

Figure 4:
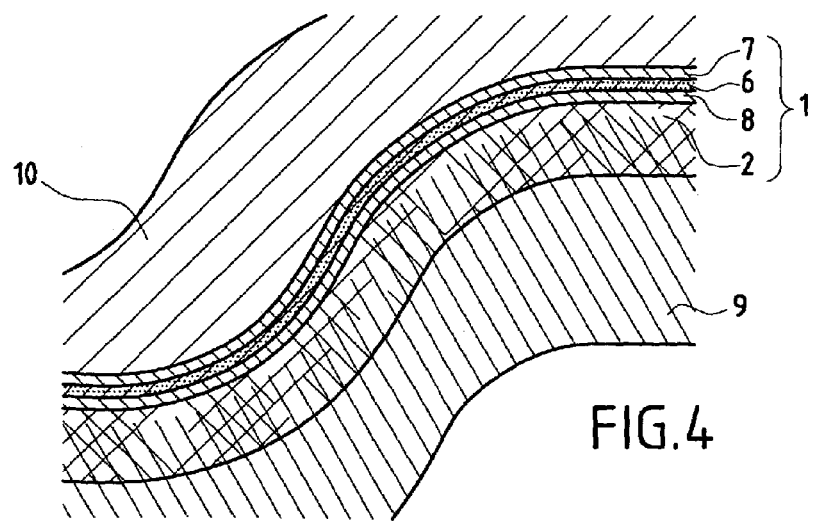
FIG. 4 is a partial section at a different scale of a composite part obtained from a fibrous stiffener according to the invention.

This invention also relates to molded composite parts composed at least partly of a fibrous stiffener according to the invention, combined with at least two thermosetting resin matrices confined on each side of the elastomer sheet. This type of molded part is shown partially in FIG. 4. Two resins 9 and 10 are injected on each side of the fibrous stiffener 1. Advantageously, a composite part according to the invention is at least partly composed of a first matrix 9 made of a thermosetting resin, for example vinylester, polyester or epoxy or phenolic resin, or a thermoplastic resin located at least partly in the fibrous layer and separated by the elastomer sheet 6 from a second polyurethane matrix 10.

The thermoplastic or thermosetting resins are injected in the liquid or paste state on each side of the fibrous stiffener 1 according to the invention. The resin 9 injected into the layer 2 forms a matrix for the fibers of this layer that is incorporated inside the thickness of the resin wall. Before polymerization begins, the elastomer sheet 6 acts as a leak tight barrier and therefore no migration of the resin can take place to the other side of the stiffener. It thus becomes easy and practical to make conform lightweight bodies or lightweight infill bodies or masses, at an attractive cost.

The polyester type resin 9 is usually injected on the side of the fibrous stiffener in order to form a reinforced wall. The polyurethane resin 10 is injected on the other side and after stiffening, forms the volume of the composite part although remaining lightweight.

In the injection state, the thermosetting resin 10 formed from polyurethane bonds with difficulty onto the elastomer sheet and this is why it is preferable if the face $6_1$ on the polyurethane side of the sheet 6 is associated with a non-woven material 9. On the other hand, in the injection state, the resin 9 formed by a thermosetting polyester resin or a thermoplastic resin adheres more easily to the elastomer sheet 6, such that the non-woven material 8 can be eliminated.

These composite parts and preforms are made using conventional techniques well known to an expert in the subject.

The fibrous stiffeners 1 and the composite parts according to the invention may be used to make boat structures such as covers, doors, rudder blades, rudders, bossing plates, portal frames, for making vehicle structures such as trunk doors, tailgates or rear view mirrors and industrial parts or sports and leisure articles, or wind generator blades.

This invention is not limited to the examples described and illustrated, and various modifications can be made to it without going outside its scope.

The invention claimed is:

1. Fibrous stiffener for making composite parts molded from an injected resin base, comprising at least one layer based on stiffening fibers which is connected by sewing or stitching to an elastomer sheet extending over a wide face of the layer and which performs a barrier function for any resin injected on a side of the sheet, the sewed or stitched elastomer sheet serving as a leak-tight barrier against injected liquid resin, the elastomer sheet being associated with a non-woven material on at least one face thereof, to improve adhesion of a resin injected on this side of the sheet.

2. Fibrous stiffener according to claim 1, wherein the elastomer sheet is associated with the non-woven material at least on a face opposite the layer.

3. Fibrous stiffener according to claim 1, wherein the elastomer sheet is associated with a non-woven material on both of faces thereof, to improve adhesion of a resin injected on each side of the sheet.

4. Fibrous stiffener according to claim 1, wherein the elastomer sheet is made of a natural rubber or a synthetic rubber.

5. Fibrous stiffener according to claim 1, wherein the elastomer sheet has a thickness of between 0.15 to 0.5 mm.

6. Fibrous stiffener according to claim 1, wherein the elastomer sheet has a density of 0.9 to 1.25.

7. Fibrous stiffener according to claim 1, wherein the elastomer sheet has a stress modulus of 0.15 to 2 MPa for 100%.

8. A molded composite part obtained from a fibrous stiffener according to claim 1, and at least two thermoplastic or thermosetting resin matrices, each confined on one side of the elastomer sheet.

9. A molded composite part according to claim 8, obtained from a first matrix made of polyester, vinylester, epoxy or phenolic resin located at least partly in the layer and separated by the elastomer sheet from a second matrix of polyurethane.

* * * * *